(12) United States Patent
Saito

(10) Patent No.: US 9,933,723 B2
(45) Date of Patent: Apr. 3, 2018

(54) ELECTROPHOTOGRAPHIC IMAGE FORMING APPARATUS, AND IMAGE FORMING UNIT

(71) Applicant: KYOCERA Document Solutions Inc., Osaka-shi, Osaka (JP)

(72) Inventor: Yosuke Saito, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/627,248

(22) Filed: Jun. 19, 2017

(65) Prior Publication Data

US 2017/0363986 A1 Dec. 21, 2017

(30) Foreign Application Priority Data

Jun. 21, 2016 (JP) ................. 2016-122482

(51) Int. Cl.
G03G 15/04 (2006.01)
G03G 15/045 (2006.01)
H04N 1/29 (2006.01)
H04N 1/06 (2006.01)
G03G 21/00 (2006.01)
G03G 21/06 (2006.01)

(52) U.S. Cl.
CPC ....... *G03G 15/045* (2013.01); *G03G 21/0094* (2013.01); *G03G 21/06* (2013.01); *H04N 1/06* (2013.01); *H04N 1/29* (2013.01); *H04N 2201/0094* (2013.01)

(58) Field of Classification Search
CPC .... G03G 21/00; G03G 21/0094; G03G 21/06; G03G 21/08; G03G 15/04; G03G 15/04036; G03G 15/045; G03G 15/169; G03B 27/52; G03B 27/54; G03B 27/542; H04N 1/06; H04N 1/29
See application file for complete search history.

(56) References Cited

U.S. PATENT DOCUMENTS

| 9,354,561 B1 * | 5/2016 | Oi ................ G03G 21/00 |
| 2004/0253019 A1 * | 12/2004 | Asuwa ........... G03G 15/04036 399/116 |

FOREIGN PATENT DOCUMENTS

JP 1993064868 U 8/1993

* cited by examiner

*Primary Examiner* — Hoang Ngo
(74) *Attorney, Agent, or Firm* — Alleman Hall Creasman & Tuttle LLP

(57) ABSTRACT

An image forming apparatus includes an image carrier and a charge removing portion. An electrostatic latent image is formed on the image carrier. The charge removing portion includes: a light source configured to emit light to be used for removing charge from the image carrier; a light concentrating portion configured to concentrate the light emitted from the light source on a surface of the image carrier; and a light source supporting portion formed integrally with the light concentrating portion and supporting the light source at a supporting position in which the light source and the light concentrating portion have a predetermined positional relationship.

6 Claims, 3 Drawing Sheets

ELECTROPHOTOGRAPHIC IMAGE FORMING APPARATUS, AND IMAGE FORMING UNIT

INCORPORATION BY REFERENCE

This application is based upon and claims the benefit of priority from the corresponding Japanese Patent Application No. 2016-122482 filed on Jun. 21, 2016, the entire contents of which are incorporated herein by reference.

BACKGROUND

The present disclosure relates to an electrophotographic image forming apparatus, and an image forming unit provided in the image forming apparatus.

An image forming apparatus, such as a printer, which is capable of forming an image by electrophotography includes an image carrier and a charge removing portion. An electrostatic latent image is formed on the surface of the image carrier. The electrostatic latent image formed on the image carrier is developed as a toner image through a developing process using toner, and then is transferred to a transferred member such as an intermediate transfer belt. The charge removing portion applies light to the surface of the image carrier to which the toner image has been transferred, to remove charge from the surface of the image carrier. Here, there is known an image forming apparatus including a charge removing portion that includes: a light source that emits light to be used for removing charge from the surface of the image carrier; and a light concentrating portion concentrating light emitted from the light source on the surface of the image carrier.

SUMMARY

An image forming apparatus according to one aspect of the present disclosure includes an image carrier and a charge removing portion. An electrostatic latent image is formed on the image carrier. The charge removing portion includes: a light source configured to emit light to be used for removing charge from the image carrier; a light concentrating portion configured to concentrate the light emitted from the light source on a surface of the image carrier; and a light source supporting portion formed integrally with the light concentrating portion and supporting the light source at a supporting position in which the light source and the light concentrating portion have a predetermined positional relationship.

An image forming unit according to another aspect of the present disclosure includes an image carrier and a charge removing portion. An electrostatic latent image is formed on the image carrier. The charge removing portion includes: a light source configured to emit light to be used for removing charge from the image carrier; a light concentrating portion configured to concentrate the light emitted from the light source on a surface of the image carrier; and a light source supporting portion formed integrally with the light concentrating portion and supporting the light source at a supporting position in which the light source and the light concentrating portion have a predetermined positional relationship.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. It should be noted that the following embodiment is an example embodying the present disclosure and does not limit the technical scope of the present disclosure.

Figure 1:
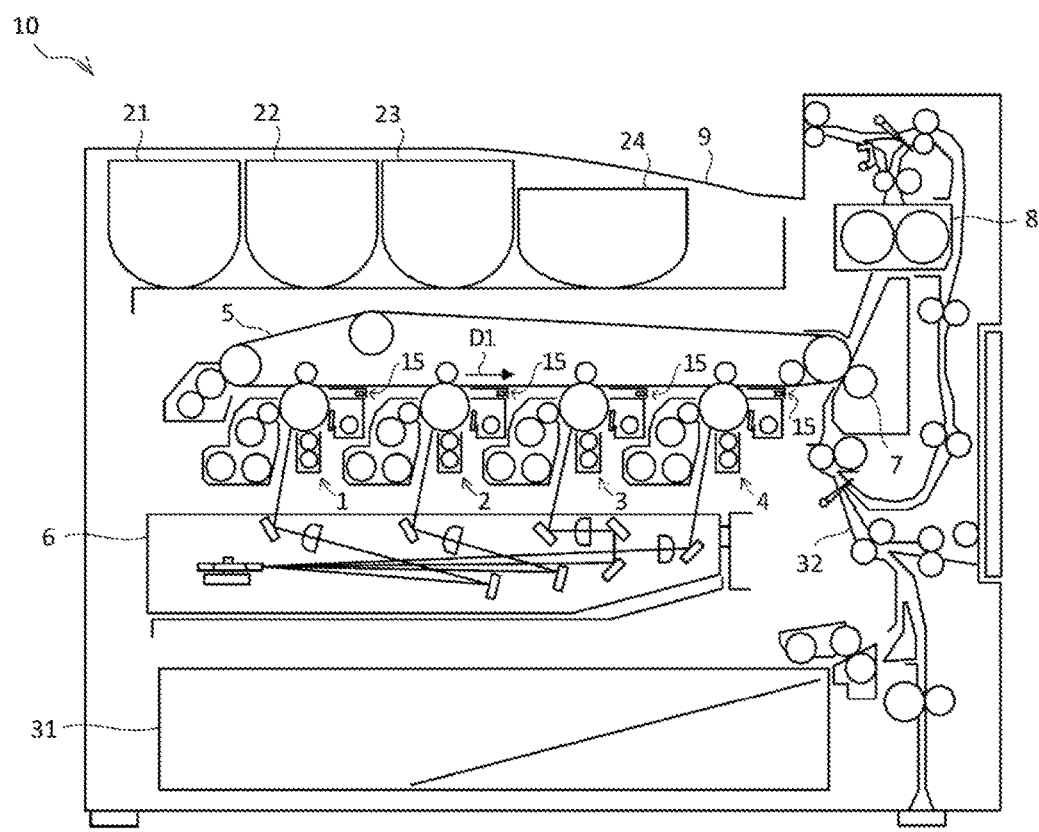
FIG. 1 is a diagram showing the configuration of an image forming apparatus according to an embodiment of the present disclosure.

As shown in FIG. 1, an image forming apparatus 10 includes a plurality of image forming portions 1 to 4, an intermediate transfer belt 5 (an example of a transferred member of the present disclosure), a laser scanning unit 6, a secondary transfer roller 7, a fixing device 8, a sheet discharge tray 9, toner containers 21 to 24, a sheet feed cassette 31, a conveyance path 32, and the like. The image forming apparatus 10 is a color printer that forms, on sheet-like paper fed along the conveyance path 32 from the sheet feed cassette 31, a color image or a monochrome image based on image data inputted from an information processing apparatus. In addition, a facsimile, a copying machine, a multifunction peripheral, and the like are also examples of the image forming apparatus according to the present disclosure.

The image forming apparatus 10 is so called a tandem type image forming apparatus. Image forming portions 1 to 4 are arranged side by side along a belt rotation direction D1 (an example of a moving direction of the present disclosure) of the intermediate transfer belt 5. A toner image corresponding to Y (yellow) is formed in the image forming portion 1, a toner image corresponding to M (magenta) is formed in the image forming portion 2, a toner image corresponding to C (cyan) is formed in the image forming portion 3, and a toner image corresponding to K (black) is formed in the image forming portion 4.

Figure 2:
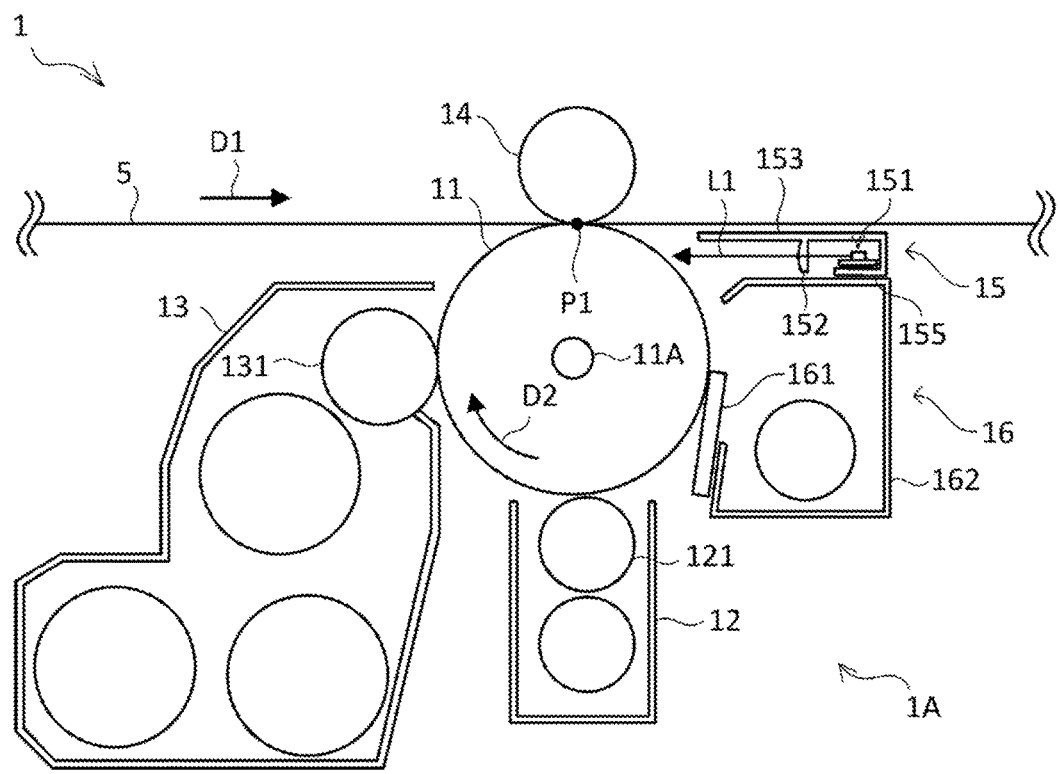
FIG. 2 is a diagram showing the configuration of an image forming portion of the image forming apparatus according to the embodiment of the present disclosure.

FIG. 2 is a schematic diagram showing a schematic configuration of the image forming portion 1. As shown in FIG. 2, the image forming portion 1 includes a photosensitive drum 11 (an example of an image carrier of the present disclosure), a charging portion 12 provided so as to correspond to the photosensitive drum 11, a developing portion 13, a primary transfer roller 14 (an example of a transfer portion of the present disclosure), and a cleaning device 16 (an example of a cleaning portion of the present disclosure). In addition, the image forming portion 1 also includes a charge removing portion 15. Since the image forming portions 2 to 4 are configured similarly to the image forming portion 1, a description thereof is omitted.

The photosensitive drum 11, the charging portion 12, the charge removing portion 15, and the cleaning device 16 are united as an image forming unit 1A. The image forming unit 1A is detachably provided in a housing of the image forming apparatus 10. For example, the image forming unit 1A is detached from the housing of the image forming apparatus 10 when the image forming unit 1A is under maintenance or is replaced by a new one.

The photosensitive drums 11 are arranged side by side along the belt rotation direction D1 of the intermediate transfer belt 5. Each of the photosensitive drums 11 is an image carrier that carries an electrostatic latent image and a toner image. The photosensitive drum 11 is rotatably provided in a rotation direction D2. Each of the charging portions 12 includes a charging roller 121. By using the charging roller 121, the charging portion 12 charges the photosensitive drum 11 at a predetermined potential by use of electric power supplied from an unillustrated power supply. Then, laser light is applied by the laser scanning unit 6 to the photosensitive drum 11 charged by the charging portion 12, and an electrostatic latent image based on image data is formed on the outer circumference surface of the photosensitive drum 11. Each of the developing portions 13 includes a developing roller 131. By using the developing roller 131, the developing portion 13 develops the electrostatic latent image formed on the photosensitive drum 11 by use of toner (developer). An external additive such as a lubricant or a polishing agent is used together with toner to develop an electrostatic latent image by the developing portion 13. Toner is supplied to the developing portions 13 from the detachable toner containers 21 to 24 that correspond to the respective colors.

Each of the primary transfer rollers 14 transfers, onto the intermediate transfer belt 5, the toner image on the photosensitive drum 11 developed by the developing portion 13. The intermediate transfer belt 5 is a transferred member that travels above the photosensitive drums 11 of the respective image forming portions 1 to 4 and to which toner images of the respective colors formed on the photosensitive drums 11 are transferred in a sequentially overlapping manner. The toner image on the intermediate transfer belt 5 is transferred to a paper sheet conveyed by the secondary transfer roller 7 from the sheet feed cassette 31 via the conveyance path 32. Then, the toner image transferred to the paper sheet is heated by the fixing device 8 to be fixed on the paper sheet. Each of the cleaning devices 16 is provided at the downstream side in the rotation direction D2 of the photosensitive drum 11 with respect to the primary transfer roller 14, and cleans the surface of the photosensitive drum 11. Each of the cleaning devices 16 includes a cleaning member 161 such as a cleaning roller or a cleaning blade, and a housing 162 that houses constituent members of the cleaning device 16.

Figure 3:
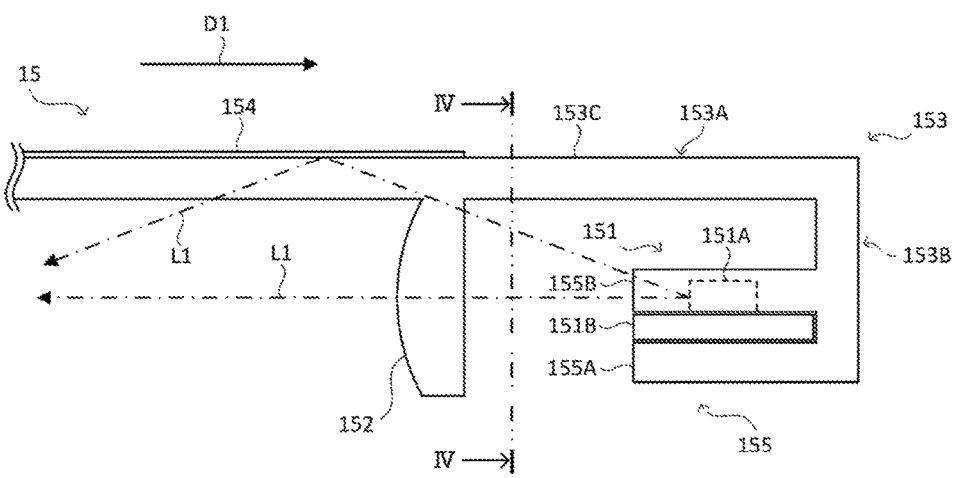
FIG. 3 is a diagram showing the configuration of a charge removing portion of the image forming apparatus according to the embodiment of the present disclosure.
Figure 4:
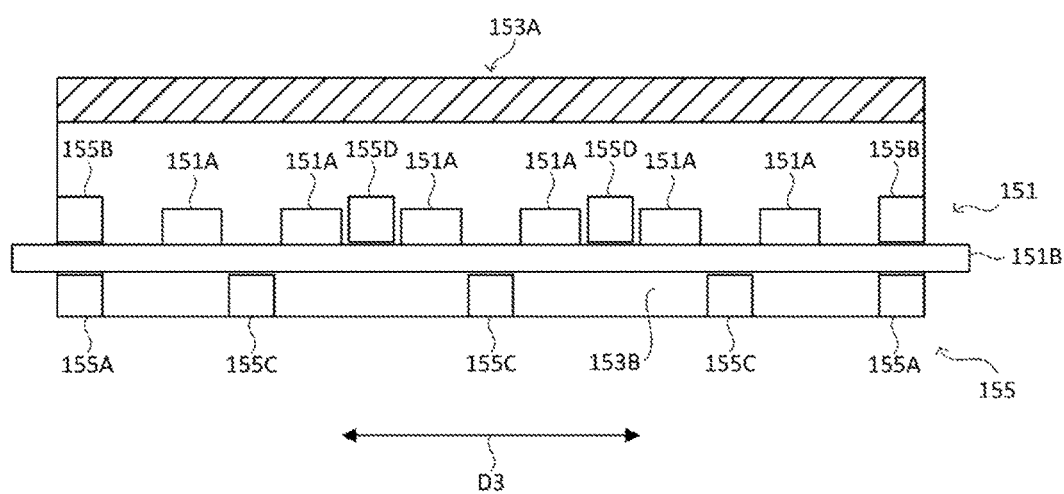
FIG. 4 is a diagram showing the configuration of a light source supporting portion of the image forming apparatus according to the embodiment of the present disclosure.

Next, with reference to FIG. 2 to FIG. 4, the charge removing portion 15 will be described. FIG. 3 is a schematic diagram showing the configuration of the charge removing portion 15. In addition, FIG. 4 is a sectional view as seen from the direction of arrows IV-IV in FIG. 3. In FIG. 3, a light L1 is shown by a dotted-dashed line.

The charge removing portion 15 applies the light L1 to the surface of the photosensitive drum 11 to which the toner image has been transferred, to remove charge from the surface of the photosensitive drum 11.

As shown in FIG. 2, the charge removing portion 15 is provided at the downstream side in the rotation direction D2 of the photosensitive drum 11 with respect to the primary transfer roller 14 and at the upstream side in the rotation direction D2 with respect to the cleaning device 16. Specifically, the charge removing portion 15 is provided at the upper surface of the housing 162 of the cleaning device 16.

The charge removing portion 15 may be provided at the downstream side in the rotation direction D2 of the photosensitive drum 11 with respect to the developing portion 13 and at the upstream side in the rotation direction D2 with respect to the primary transfer roller 14. In addition, the charge removing portion 15 may be provided at the downstream side in the rotation direction D2 of the photosensitive drum 11 with respect to the cleaning device 16 and at the upstream side in the rotation direction D2 with respect to the charging portion 12.

As shown in FIG. 2 and FIG. 3, the charge removing portion 15 includes a light source 151, a light concentrating portion (light concentrating lens) 152, a cover portion 153, a reflecting portion 154, and a light source supporting portion 155.

The light source 151 emits the light L1 to be used for removing charge from the photosensitive drum 11. As shown in FIG. 3 and FIG. 4, the light source 151 includes a plurality of LED elements 151A and a base 151B.

The base 151B is provided so as to be long along an axial direction D3 (see FIG. 4) of a rotation shaft 11A of the photosensitive drum 11. In addition, the base 151B is supported above the cleaning device 16 by the light source supporting portion 155 described below. The plurality of LED elements 151A are mounted on the base 151B. As shown in FIG. 4, the plurality of LED elements 151A are provided at equal intervals along the axial direction D3 on the base 151B. The plurality of LED elements 151A emit the light L1 toward the photosensitive drum 11.

The light concentrating portion 152 concentrates the light L1 emitted from the light source 151 on the surface of the photosensitive drum 11. For example, the light concentrating portion 152 is a cylindrical lens that refracts the incident light L1 in an up-down direction. The light concentrating portion 152 is provided so as to be long along the axial direction D3 (see FIG. 4) of the rotation shaft 11A of the photosensitive drum 11.

The light concentrating portion 152 is provided on a movement path of the light L1 emitted from the light source 151. For example, the light source 151 and the light concentrating portion 152 are provided in a positional relationship in which the light source 151 is separate from the light concentrating portion 152 by a predetermined distance on an optical axis of the light concentrating portion 152. For example, as shown in FIG. 2, the light source 151 and the light concentrating portion 152 are arranged side by side along the belt rotation direction D1 above the cleaning device 16 located at the downstream side in the belt rotation direction D1 of the intermediate transfer belt 5 with respect to a transfer position P1 (see FIG. 2) of a toner image by the primary transfer roller 14.

Here, toner transferred to the intermediate transfer belt 5 may float at the downstream side in the belt rotation direction D1 with respect to the transfer position P1. When the floating toner is adhered to the light source 151, the amount of the light L1 emitted from the light source 151 is decreased. In addition, when the floating toner is adhered to the light concentrating portion 152, the amount of the light L1 concentrated on the surface of the photosensitive drum 11 is decreased. Therefore, the charge removing portion 15 is provided with the cover portion 153.

The cover portion 153 extends along the belt rotation direction D1, thereby separating the light source 151 and the light concentrating portion 152 from the intermediate transfer belt 5. For example, as shown in FIG. 3, the cover portion 153 includes a top plate portion 153A and a side wall portion 153B.

The top plate portion 153A is provided above the light source 151 and the light concentrating portion 152. The top plate portion 153A is long along the axial direction D3 (see FIG. 4) of the rotation shaft 11A of the photosensitive drum 11. In addition, the top plate portion 153A extends from above the light concentrating portion 152 toward the transfer position P1 side. The side wall portion 153B is provided in a standing manner downward at the downstream end in the belt rotation direction D1 of the top plate portion 153A.

The light source 151 and the light concentrating portion 152 are provided within a space surrounded by the top plate portion 153A, the side wall portion 153B, and the upper surface of the housing of the cleaning device 16. Accordingly, the toner floating from the intermediate transfer belt 5 is prevented from being adhered to the light source 151 and the light concentrating portion 152.

Here, the cover portion 153 is formed integrally with the light concentrating portion 152. For example, the light concentrating portion 152 and the cover portion 153 are formed of a transparent plastic such as acrylic plastic or polycarbonate plastic. Accordingly, the number of parts of the image forming apparatus 10 is decreased, and the number of steps for mounting parts is decreased. For example, the light concentrating portion 152 is formed so as to project downward from the bottom surface of the top plate portion 153A of the cover portion 153. The cover portion 153 may be a member separate from the light concentrating portion 152.

The reflecting portion 154 is provided on a surface 153C (see FIG. 3), of the cover portion 153, that is opposed to the intermediate transfer belt 5, and reflects the light L1 emitted from the light source 151, toward the photosensitive drum 11. Thus, of the light L1 emitted from the light source 151, light passing through the cover portion 153 and leaking outside can be partially applied toward the photosensitive drum 11. Therefore, the amount of the light L1 applied to the surface of the photosensitive drum 11 is increased.

The reflecting portion 154 is a seal-like member that has a mirror surface and that is stuck on the opposed surface 153C of the cover portion 153. The reflecting portion 154 is provided in a partial area at the upstream side in the belt rotation direction D1 of the opposed surface 153C of the cover portion 153. The reflecting portion 154 may be provided on the entirety of the opposed surface 153C of the cover portion 153. In addition, the reflecting portion 154 may be a metal member that has a mirror surface and that is placed on the opposed surface 153C of the cover portion 153.

Incidentally, a position of the light source 151 with respect to the light concentrating portion 152 may be displaced due to dimensional errors of parts of the image forming apparatus 10. In this case, the amount of light concentrated on the surface of the photosensitive drum 11 by the light concentrating portion 152 is decreased, whereby charge may not be sufficiently removed from the surface of the photosensitive drum 11. When charge is not sufficiently removed from the surface of the photosensitive drum 11, a failure, called exposure memory, in which the image formed in the previous image formation process appears in an image to be formed in the following image formation process, may occur. Meanwhile, as described below, the image forming apparatus 10 according to an embodiment of the present disclosure can suppress a positional displacement, with respect to the light concentrating portion 152, of the light source 151 in the charge removing portion 15.

The light source supporting portion 155 supports the base 151B of the light source 151 at a supporting position in which the light source 151 and the light concentrating portion 152 have a predetermined positional relationship. For example, the positional relationship is a positional relationship in which the light source 151 is separate from the light concentrating portion 152 by a predetermined distance on an optical axis of the light concentrating portion 152.

Here, the light source supporting portion 155 is formed integrally with the light concentrating portion 152 and the cover portion 153. That is, the light source supporting portion 155 is formed integrally with the light concentrating portion 152 and the cover portion 153 by means of a transparent plastic such as acrylic plastic or polycarbonate plastic. Accordingly, as compared with the case where the light source supporting portion 155 is made of a member separate from the light concentrating portion 152, the positioning accuracy of the light source 151 with respect to the light concentrating portion 152 is improved. Therefore, this suppresses a positional displacement of the light source 151 with respect to the light concentrating portion 152 due to dimensional errors of parts of the image forming apparatus 10.

For example, as shown in FIG. 3 and FIG. 4, the light source supporting portion 155 includes a pair of first supporting portions 155A, a pair of second supporting portions 155B, third supporting portions 155C, and fourth supporting portions 155D.

As shown in FIG. 4, the pair of the first supporting portions 155A support the bottom surfaces of the respective both end portions of the base 151B in the axial direction D3 of the rotation shaft 11A of the photosensitive drum 11. For example, as shown in FIG. 3, the pair of the first supporting portions 155A are provided so as to extend from both end portions in the axial direction D3 of the side wall portion 153B of the cover portion 153, toward the emitting direction of the light L1 by the light source 151.

As shown in FIG. 4, the pair of the second supporting portions 155B support the upper surfaces of both end portions of the base 151B in the axial direction D3 of the rotation shaft 11A of the photosensitive drum 11. For example, as shown in FIG. 3, the pair of the second supporting portions 155B are provided so as to extend from both end portions in the axial direction D3 of the side wall portion 153B of the cover portion 153, toward the emitting direction of the light L1 by the light source 151. The position, in the up-down direction, of the base 151B is fixed by the first supporting portions 155A and the second supporting portions 155B.

The cover portion 153 may include a side wall portion that covers both lateral sides, in the axial direction D3, of the light source 151. In this case, the first supporting portions 155A and the second supporting portions 155B may be provided at the side wall portion. In addition, the second supporting portions 155B may not be provided.

As shown in FIG. 4, the third supporting portions 155C support the bottom surface inward of both end portions of the base 151B in the axial direction D3 of the rotation shaft 11A of the photosensitive drum 11. For example, the third supporting portions 155C are provided so as to extend from the side wall portion 153B of the cover portion 153, toward the emitting direction of the light L1 by the light source 151. For example, a plurality of the third supporting portions 155C are provided.

As shown in FIG. 4, the fourth supporting portions 155D support the upper surface inward of both end portions of the base 151B in the axial direction D3 of the rotation shaft 11A of the photosensitive drum 11. For example, the fourth supporting portions 155D are provided so as to extend from the side wall portion 153B of the cover portion 153, toward the emitting direction of the light L1 by the light source 151. For example, a plurality of the fourth supporting portions 155D are provided. By the third supporting portions 155C and the fourth supporting portions 155D, a center portion in the axial direction D3 of the base 151B is prevented from bending in the up-down direction.

For example, the charge removing portion 15 is attached to the upper surface of the housing of the cleaning device 16 by means of adhesive material, such as a double-sided tape, adhering the upper surface of the housing of the cleaning device 16 and the bottom surfaces of the first supporting portions 155A and the third supporting portions 155C. The bottom surface of the light concentrating portion 152 and the upper surface of the housing of the cleaning device 16 may be adhered to each other by means of adhesive material. In addition, the side wall portion 153B of the cover portion 153 may extend downward with respect to the first supporting portions 155A and the third supporting portions 155C. In this case, the side wall portion 153B and the side surface of the housing of the cleaning device 16 may be adhered to each other by means of adhesive material.

As described above, in the image forming apparatus 10, the light concentrating portion 152 and the light source supporting portion 155 are formed integrally with each other. This suppresses a positional displacement of the light source 151 with respect to the light concentrating portion 152 due to dimensional errors of parts of the image forming apparatus 10.

Although in the above embodiment, the charge removing portion 15 including the cover portion 153 and the reflecting portion 154 has been described as an example, the charge removing portion 15 may not include the cover portion 153 and the reflecting portion 154. In addition, the charge removing portion 15 may include the cover portion 153, and may not include the reflecting portion 154.

In addition, the present disclosure may be applied to a direct-transfer-type image forming apparatus that directly transfers a toner image formed on the photosensitive drum 11 onto sheet-like paper supplied from the sheet feed cassette 31 along the conveyance path 32. In this case, the sheet-like paper is another example of the transferred member in the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
an image carrier on which an electrostatic latent image is formed; and
a charge removing portion including: a light source configured to emit light to be used for removing charge from the image carrier; a light concentrating portion configured to concentrate the light emitted from the light source on a surface of the image carrier; and a light source supporting portion formed integrally with the light concentrating portion and supporting the light source at a supporting position in which the light source and the light concentrating portion have a predetermined positional relationship.

2. The image forming apparatus according to claim 1, wherein
the image carrier is provided so as to be rotatable,
the image forming apparatus further comprises:
a developing portion configured to, by use of toner, develop the electrostatic latent image formed on the image carrier;
a transfer portion configured to transfer the toner image on the image carrier developed by the developing portion onto a transferred member; and
a cleaning portion configured to clean a surface of the image carrier, the cleaning portion being provided at a downstream side in a rotation direction of the image carrier with respect to the transfer portion, and
the charge removing portion is provided at the downstream side in the rotation direction with respect to the transfer portion and at an upstream side in the rotation direction with respect to the cleaning portion.

3. The image forming apparatus according to claim 2, wherein
the light source and the light concentrating portion are arranged side by side along a moving direction of the transferred member, at a downstream side in the moving direction with respect to a transfer position of a toner image by the transfer portion, and
the charge removing portion includes a cover portion that extends along the moving direction and that separates the light source and the light concentrating portion from the transferred member.

4. The image forming apparatus according to claim 3, wherein the cover portion is formed integrally with the light concentrating portion and the light source supporting portion.

5. The image forming apparatus according to claim 4, wherein
the cover portion is formed in a transparent manner, together with the light concentrating portion, and
the image forming apparatus further comprises a reflecting portion provided on a surface, of the cover portion, that is opposed to the transferred member, the reflecting portion being configured to reflect light emitted from the light source, toward the image carrier.

6. An image forming unit comprising:
an image carrier on which an electrostatic latent image is formed; and
a charge removing portion including: a light source configured to emit light to be used for removing charge from the image carrier; a light concentrating portion configured to concentrate the light emitted from the light source on a surface of the image carrier; and a light source supporting portion formed integrally with the light concentrating portion and supporting the light source at a supporting position in which the light source and the light concentrating portion have a predetermined positional relationship.

* * * * *